United States Patent Office 2,898,302
Patented Aug. 4, 1959

2,898,302

INDIUM-ACTIVATED PHOSPHOR

Keith H. Butler, Marblehead, Mass., assignor, by mesne assignments, to Sylvania Electric Products Inc., Wilmington, Del., a corporation of Delaware No Drawing. Application March 31, 1954
Serial No. 420,198

9 Claims. (Cl. 252—301.4)

This invention relates to phosphors and their manufacture, and in particular to phosphate phosphors.

Such phosphates, including the orthophosphates and fluophosphates, of the alkaline earth metals, have heretofore been activated by antimony, tin or manganese. I have discovered, however, that they may also be activated by indium, either alone or in combination with manganese, and that when so activated the emitted color will vary from ultraviolet through most of the visible spectrum, depending on whether or not manganese is used with the indium, and on the particular alkaline earth phosphate used.

A substantial part of the indium should be present in a valence state below the normal valence of three which appears to be obtained by firing the phosphor in air, the lower valence being obtained by a final firing of the phosphor in a reducing atmosphere. The lower valence so obtained appears to be one, since that is a stable valence of indium in compounds.

In the phosphors of my invention, the amount of the metal ion should be slightly less than the stoichiometric amount for the phosphate, that is, there should be a slight deficiency of the metal ion. With the orthophosphate phosphors, the ratio of the sum of all the metal ions to phosphors should be between 2.50/2.00 to 2.96/2.00. In calculating the amount of metal ions present, the indium ions should be included in the gram-atoms amount.

The amount of indium present is preferably between 0.005 to 0.2 gram-atoms per 2 gram-atoms of phosphorus. The amount may even be greater than 0.2 gram-atoms, if desired.

The alkaline earth metals in the phosphates can be calcium, strontium, or barium, or a mixture of any two of them or of all three. In the case of mixtures, the gram-atom ratio (Ca+Sr+Ba+In)/P should be below stoichiometric, and for the orthophosphate preferably between 2.96/2.00 and 2.50/2.00. For the halophosphates, it should be between 4.95/3.00 and 4.70/3.00. The halogen used in the halophosphate may be either fluorine, chlorine, bromine or a mixture of any two of them or of all three.

These phosphate phosphors respond both to excitation by cathode rays and also to excitation by short wave ultraviolet radiation. The emitted light varies considerably in color with the composition of the alkaline earth phosphate and ranges from the long ultraviolet through most of the visible spectrum. The magnitude of the fluorescent response to ultraviolet radiation changes rapidly with the wavelength of the exiting radiation and is also dependent on the exact composition of the alkaline earth phosphate.

In Table I below, I have listed several examples of these new phosphate phosphors with the approximate composition being shown by the descriptive name in the first column, the wavelength of radiation giving optimum excitation in the second column and the color of the light emitted in the third column. The materials listed constitute only a small portion of the alkaline earth phosphates which have been made within the scope of this invention.

Table I

| Material | Optimum Exciting Radiation | Color of Emitted Light |
|---|---|---|
| Strontium Fluophosphate | 225 | Blue. |
| Barium Fluophosphate | 220 and 275 | Blue-Green. |
| Calcium Orthophosphate | Below 200 | Blue. |
| Barium Orthophosphate | 215 | Blue. |

As a specific example, I will describe the preparation of a strontium-calcium fluophosphate phosphor. The variations in the composition necessary to make other similar alkaline earth phosphate phosphors will be clear to those skilled in the art.

Materials listed in Table II below were thoroughly mixed by rolling together in a bottle. The mixture was then fired in air in covered porcelain crucibles for 2 hours at a temperature of about 1100° C. This step leads to the formation of a calcium-strontium fluophosphate powder free of activators. It showed no fluorescence.

Table II

Material:
$CaF_2$ _____gram moles___ 0.50
$CaHPO_4$ _____do_____ 1.50
$SrHPO_4$ _____do_____ 1.50
$CaCO_3$ _____do_____ 0.43
$SrCO_3$ _____do_____ 0.93
Total Ca atoms _____ 2.43
Total Sr atoms _____ 2.43
Total alkaline earth atoms _____ 4.86
Total halide atoms _____ 1.00
Total phosphorus atoms _____ 3.00

The fired material was finely ground in a mortar and then mixed with indium sesquioxide, so that the resulting mixture contained about 0.04 gram atoms of indium for each gram mole of calcium-strontium fluophosphate. This second mixture was then refired in covered crucibles in air for ½ hour at 1100° C. The resultant powder was a fluophosphate containing indium, probably in the trivalent state, in solid solution. It also showed no fluorescence. The product of this second firing was again mortar ground and placed in a porcelain boat inside a silica tube. A current of reducing gas, consisting of a mixture of 4% hydrogen and 96% nitrogen, entered at one end of the silica tube and flowed out the other end. The portion of the tube containing the boat was heated for ½ hour to 1000° C. and then cooled to approximately 300° C. with the reducing gas flow being continued during the cooling. At the end of the cooling period, the porcelain boat containing the phosphor was removed and cooled in air to room temperature. The powder was white in color and showed good yellow fluorescence when exposed to radiation from a low pressure mercury arc in a quartz envelope, which generates mainly 254 millimicron radiation. Further testing with monochromatic ultraviolet radiation showed that ultraviolet in the range from 200 to 300 millimicrons would excite the phospor giving visible fluorescence.

The phosphor preparation can be made with other raw materials than those listed in Table II, the only requirement being that the desired alkaline earth phosphate be produced. For example, normal orthophosphates approximating the composition $Ca_3(PO_4)_2$, $Sr_3(PO_4)_2$ or $Ba_3(PO_4)_2$ may replace the secondary phosphate, and oxides may be used instead of carbonates. The halogens may be introduced as ammonia salts along with the corresponding amount of alkaline earth carbonates.

Various indium compounds may also be employed to introduce the activator. Suitable compounds are the oxides, bromides, chlorides, fluorides, sulfides, nitrates and sulfate, for example.

The reducing component of the gaseous atmosphere during final firing can be any reducing gas, such as hydrogen or carbon monoxide, for example, and the inert gas compound can be any of the so-called rare gases (xenon, krypton, argon, helium neon) or nitrogen, for example. Different mixtures of inert and reducing gases may also be employed and the time and temperature of firing varied considerably with only minor changes in the fluorescent behavior.

I have found also that a combination of indium and manganese gives useful alkaline earth phosphors provided that the composition is held within the specified limits and provided that the indium is reduced by firing in a reducing gas. In these phosphors the emission color is determined by the manganese content and approaches a deep red as the manganese increases. Apparently the mechanism of fluorescence is one in which the indium serves to absorb energy from the ultraviolet radiation and this absorbed energy is transferred internally to the manganese ions which then emit light.

What I claim is:

1. A phosphor consisting essentially of an alkaline earth metal phosphate activated by indium in a state of lower valence than three.

2. A phosphor consisting essentially of a phosphate of an alkaline earth metal selected from the group consisting of barium, calcium, strontium, barium and calcium, barium and strontium, strontium and calcium and barium, strontium and calcium; and indium as an activator in a state of lower valence than three.

3. The phosphor of claim 2, in which the gram-atom ratio of the alkaline earths plus indium to phosphorus is between 2.96/2.00 and 2.50/2.00.

4. The phosphor of claim 2, in which the phosphate is a halophosphate, the halogen being selected from the group consisting of chlorine, bromine, fluorine, chlorine and bromine, chlorine and fluorine, bromine and fluorine, and bromine, fluorine and chlorine, the ratio of alkaline earth plus indium to phosphorus being between 4.95/3.00 and 4.70 to 3.00.

5. The phosphor of claim 3, in which the indium content is between 0.005 to 0.2 gram atoms per gram-atoms of phosphorus, and is in a state of lower valence than three.

6. The phosphor of claim 4, in which the indium content is between 0.005 to 0.2 gram atoms per gram-atoms of phosphorus, and is in a state of lower valence than three.

7. The method of making a desired indium-activated alkaline earth phosphate phosphor, which comprises mixing the ingredients necessary to form the desired phosphor, adding an indium activator, and firing the mixture in a reducing atmosphere.

8. The method of making an indium-activated alkaline earth phosphate phosphor which comprises adding an indium activator to said phosphate, and firing the resultant mixture in a reducing atmosphere.

9. The method of converting a non-luminescent indium-activated alkaline earth phosphate to a luminescent phosphor which comprises firing the phosphor in a reducing atmosphere.

References Cited in the file of this patent

UNITED STATES PATENTS 2,545,880     Froelich _____ Mar. 20, 1951
2,676,111     Reynolds _____ Apr. 20, 1954

OTHER REFERENCES

De Ment: Rarer Metals, Chemical Publishing Co. Inc., 1946, p. 38.